(12) United States Patent
Kobayashi et al.

(10) Patent No.: US 6,471,375 B2
(45) Date of Patent: Oct. 29, 2002

(54) FLOOD LAMP WITH IMPROVED LIGHT ENERGY UTILIZATION

(75) Inventors: Motoaki Kobayashi, Mitaka; Toshifumi Nakano, Sagamihara, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/860,305

(22) Filed: May 18, 2001

(65) Prior Publication Data

US 2001/0022725 A1 Sep. 20, 2001

Related U.S. Application Data

(62) Division of application No. 09/075,417, filed on May 8, 1998.

(51) Int. Cl.$^7$ ................................................. F21V 5/00
(52) U.S. Cl. ...................... 362/285; 362/257; 362/327; 362/328; 362/335; 359/726; 359/727
(58) Field of Search ................................. 362/285, 257, 362/308, 328, 335, 307, 327, 329; 359/726, 727

(56) References Cited

U.S. PATENT DOCUMENTS 2,072,849 A * 3/1937 Dietrich ...................... 362/329
3,633,022 A * 1/1972 Otto ............................ 362/327
5,014,166 A * 5/1991 Draper et al. ................ 362/307
5,086,379 A * 2/1992 Denison et al. ............. 362/285

FOREIGN PATENT DOCUMENTS

| JP | 61-230110 | 10/1986 |
| JP | 1-75208 | 5/1989 |
| JP | 5-53177 | 3/1993 |
| JP | 8-54668 | 2/1996 |

* cited by examiner

Primary Examiner—Cassandra Spyrou
Assistant Examiner—Leo Boutsikaris
(74) Attorney, Agent, or Firm—Ostrolenk, Faber, Gerb & Soffen, LLP

(57) ABSTRACT

A flood light includes a lamp that is located at a focus of a reflecting mirror having a reflecting surface whose cross-section is oval and partially arcuate. A concave lens having negative refracting power is disposed between first and second foci about which an elliptical reflecting surface of the reflecting mirror is disposed. Some light rays from the lamp pass directly from the lamp through the lens while other rays from the lamp are reflected by the mirror before passing through the lens. Generally speaking, on the upstream side of the lens, the reflected rays enter the lens outboard of the rays that pass directly from the lamp to the lens. This construction provides a small flood light that has a high optical output, and effectively uses bundles of rays emitted from the lamp to produce a luminous intensity distribution desirable as light for range finding.

8 Claims, 11 Drawing Sheets

CONTOUR MAP

CROSS SECTION TAKEN ON PLANE x = 0

CROSS SECTION TAKEN ON PLANE y = 0

FLOOD LAMP WITH IMPROVED LIGHT ENERGY UTILIZATION

CROSS REFERENCE TO RELATED APPLICATIONS

This is a divisional of U.S. patent application Ser. No. 09/075,417, filed May 8, 1988, in the name of Motoaki KOBAYASHI et al. and entitled "Flood Light". The entirety of that application is hereby incorporated by reference.

BACKGROUND OF THE INVENTION

1. Field of the Invention

The present invention relates to a flood light for a camera and the like, for example, a flood light for both active and passive range finding devices.

2. Description of the Related Art

Various lights have been proposed and been put into practical use as flood lights for cameras.

For example, a flood light for a flood lighting type of range finding device disclosed in Japanese Unexamined Patent Publication No. 61-230110 is constructed so that light reflected by a spherical mirror can be cast from a flood lighting hole provided in the spherical mirror. A hole is provided in the spherical mirror for conveying the light from an emission means.

In addition, the auxiliary light casting device for range finding disclosed in Japanese Unexamined Utility Publication No. 1-75208 has emission means that is located inversely to the flood lighting direction. A beam emitted from the emission means is reflected by two concave mirrors whose ends are connected with each other.

Furthermore, in an auxiliary illumination device disclosed in Japanese Unexamined Patent Publication No. 8-54668, emission means is located at a focal position of a reflector having an oval cross-section, and at the same time, is located at the vicinity of a focal point of a flood lighting lens that has a positive refractive index and is provided before the emission means. Then, the direct light from the emission means is cast as a beam, and the light reflected by the reflector emerges as diffused light.

The conventional illumination devices referred to above, have defects that are referred to below.

That is, in the flood lighting type of range finding device disclosed in Japanese Unexamined Patent Publication No. 61-230110, a beam that is poured from an emitter or emission means (a light source) and enters into a spherical mirror, is directed to a subject after reflecting several times in the spherical mirror. Therefore, for the outgoing light beam energy loss becomes large. For this reason, it is necessary to increase brightness by using a plurality of emission means so as to obtain sufficient luminous energy. This, however, makes the shape of the flood light large.

In the auxiliary light casting device for range finding disclosed in Japanese Unexamined Utility Publication No. 1-75208, an emission side of faces reflecting surfaces of two concave mirrors connected in linear symmetry. Hence only beams reflected by these concave mirrors are used as the auxiliary light for range finding. Generally, a beam is not directed to a particular direction but is spread in various directions. But the above-mentioned concave mirrors cannot reflect all beams emitted from the emission means. In order to efficiently use beams from the emission means, enlargement of areas of the concave mirrors, or other measures, should be taken.

Furthermore, in an auxiliary illumination device as disclosed in Japanese Unexamined Patent Publication No. 8-54668, although the direct light from the emission means becomes a beam used for range finding, reflected light diffuses uselessly. The instant disclosure includes FIG. 14 which is a ray diagram drawn in accordance with a paraxial theory. In FIG. 14, among rays emitted from emission means 100, are both direct rays 113, and reflected rays 112 pouring into the convex lens 108 after reflecting from reflector 103. Direct rays 113 are illustrated with alternate long and short dash lines while reflected rays 112 are illustrated with solid lines.

As shown in FIG. 14, the reflected rays 112 pass through the convex lens 108 and diffuse in a range wider than a range where the range finding device performs range finding, and hence the rays do not exhibit an effect as auxiliary light. On the other hand, in regard to the direct rays 113, since there is a focus of the convex lens 108 nearby a light source, the rays emerge from the convex lens 108 in a beam. The direct rays exhibit the effect as the auxiliary light.

Thus, according to this construction, only a part of a bundle of rays emitted from the emission means are used as the auxiliary light. In addition, since the direct rays having the shape of the light source are cast as it is, the luminous intensity distribution of flood lighting is not uniform, as shown in the contour map of FIG. 15. Thus, a mountain in a center part is the direct ray and the foot of the mountain is the reflected rays that diffuse. These reflected rays diffuse in a comparatively wide range against the direct rays in the center part. Assuming that a range for range finding is a part illuminated by the direct rays, the reflected rays that diffuse illuminate places irrelevant to the range finding.

Therefore, according to the construction of the invention described in the above-mentioned Japanese Unexamined Patent Publication No. 8-54668, only a part of a bundle of rays emitted from the emission means are used as the auxiliary light. Furthermore, since rays in heterogeneous luminous intensity distribution are cast, correct range finding cannot be performed.

In this manner, none of the above-mentioned conventional art is an efficient user of the energy from the emission means. In order to increase luminance, it is necessary to take special measures such as enlarging the reflecting mirrors and refraction means, increasing the energy supplied to the light sources, and the like. For this reason, each of the above prior art technology a problem that results in increased space for a flood light utilized for a camera. In addition, each of the prior art arrangements described above produces a luminous intensity distribution that is not suitable for range finding.

SUMMARY OF THE INVENTION

Accordingly, an object of the present invention is to provide a small flood light, that has an high optical output by effectively using a bundle of rays emitted from emission means and desirable luminous intensity distribution.

A flood light of the present invention comprises emission means, reflection means that reflects rays from the emission means forwardly, and an optical element that is in front of the emission means and makes the rays from the emission means and the rays reflected by the reflection means pass through the optical element. Furthermore, the flood light is characterized in that a reflecting surface provided in the reflection means is constructed of a concave mirror, and the optical element is concave and has negative refracting power.

BRIEF DESCRIPTION OF THE DRAWINGS

Additional features and advantages of the present invention will become apparent from the following description of the accompanying drawings in which.

DESCRIPTION OF THE PREFERRED EMBODIMENTS

Figure 1:
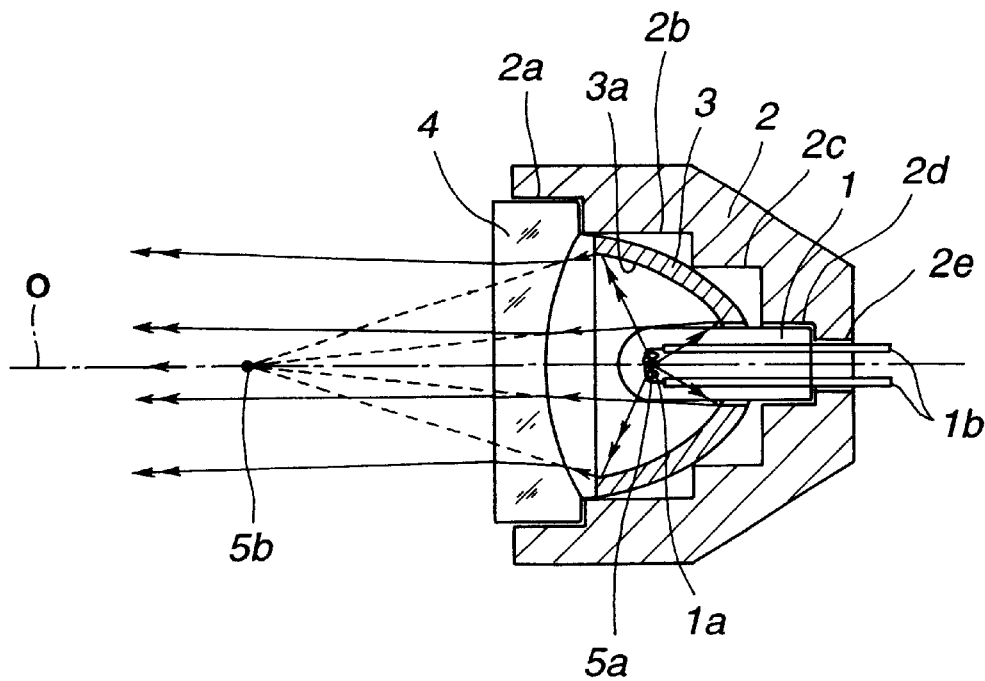
FIG. 1 is a central vertical cross-sectional view of a flood light showing a first embodiment of the present invention.
Figure 2:
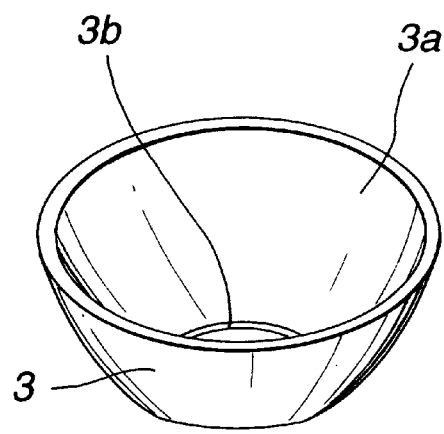
FIG. 2 is a perspective of a reflecting mirror applied to the flood light in FIG. 1.
Figure 3:
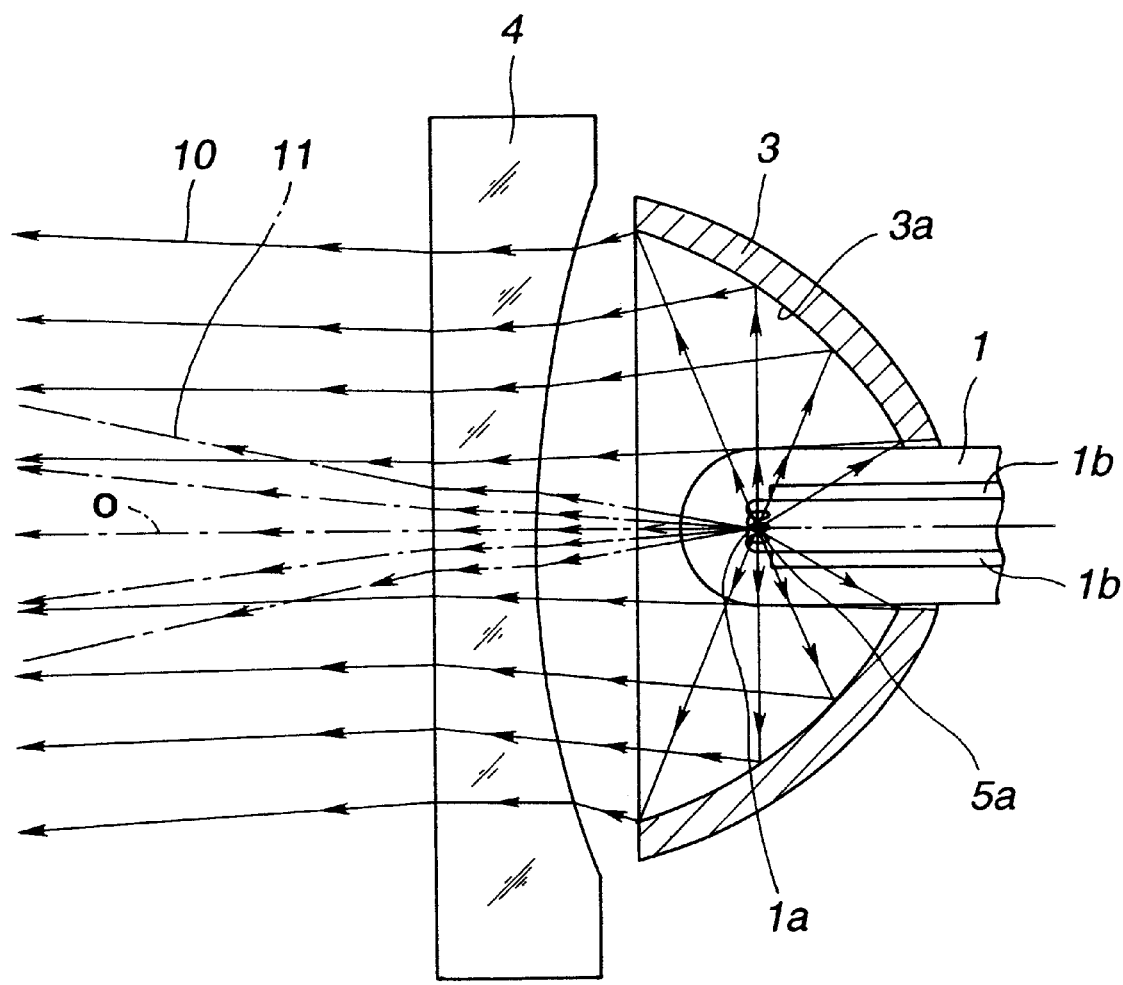
FIG. 3 is an explanatory diagram showing reflection and refraction of a bundle of rays emitted from a light source lamp of the flood light in FIG. 1.

Now referring particularly to FIGS. 1 through 3 wherein a flood light constructed according to a first embodiment of the present invention, includes a major part comprising an emitter or light source lamp 1 that constitutes an emission means mounted to a fixing unit in the form of member 2, a reflector in the form of mirror 3 that constitutes a reflecting means for forwardly reflecting rays which are emitted from the light source lamp 1, a concave lens 4 that constitutes an optical element that refracts direct rays from lamp 1 as well as rays that are reflected from reflecting mirror 3, in negative directions.

In fixing member 2, a holding section is formed for fixing the lamp 1, reflecting mirror 3, and concave lens 4, respectively. This holding section is formed so that cylindrical holding portions are constituted by holes 2a, 2b, 2c, and 2d and a through hole 2e which have different inner diameters. Holes 2a–2e are positioned on emergence optical axis O as a center and are disposed in a row in the decreasing order of their inner diameters.

In the holding hole 2d, a base-end section of the lamp 1 is fitted in and fixed, and electrode terminals 1b extend to the outside from the through hole 2e. The lamp 1 is a cylindrical lamp having an outer diameter that is nearly identical to the inner diameter of the holding hole 2d, and the front end section of lamp 1 is formed hemispherically. In an approximately central position of the front end section in this lamp 1, an emission section 1a composed of a filament is provided, and power for emission is supplied from a power supply unit (not shown), through the electrode terminals 1b.

The reflecting mirror 3, as shown in FIG. 2, is formed with an elliptic concave mirror having an inner reflecting surface 3a, and, as shown in FIG. 1, the reflecting surface 3a has a bowl-like shape formed by rotating an ellipse, including a focus of the ellipse, about a long axis. In addition, a through hole 3b (see FIG. 2) having the center on the long axis of the ellipse and having an inner diameter that is nearly identical to the outer diameter of the lamp 1 is formed in the base section of reflecting mirror 3.

This reflecting mirror 3 is fixed to the fixing member 2 with the periphery of the larger end-opening of the reflecting mirror 3 being fitted in the holding hole 2b and the peripheral surface of the middle section of the reflecting mirror 3 engaging a step formed where the holding holes 2b and 2c meet. In this state, the long axis of the ellipse and the optical axis O coincide with each other, the focus 5a is positioned on the optical axis O and further the other focus 5b of the ellipse 3a corresponding to the focus 5a is also positioned on the optical axis O. Furthermore, an end section of the lamp 1 is inserted into the through hole 3b of the reflecting mirror 3, and the emission section 1a of this lamp 1 is located at the position coinciding with the focus 5a.

The outer diameter of concave lens 4 is nearly identical to the diameter of the holding hole 2a, and concave lens 4 is fixed in the holding hole 2a with the concave side of lens 4 facing the reflecting surface 3a of the reflecting mirror 3. Indeed, as plainly disclosed in FIGS. 1, 3, 8 and other figures (e.g., 9, 10, 12 and 13), the concave surface 4a facing the reflecting mirror 3 is a smooth surface without any sharp radius of curvature discontinuities. Moreover, the opposite lens surface 4b, facing outwardly, is not convex. Here, the concave lens 4 is positioned between the foci 5a and 5b on the optical axis O. In addition, the refracting power of the concave lens 4 is set so that a bundle of rays passing through the concave lens 4 emerges therefrom at an angle that is a desired result in a desired luminous intensity distribution downstream of lens 4.

In the flood light for range finding, when current is supplied from a power supply unit (not shown) to the light source lamp 1, the lamp 1 emits rays. Then, each bundle of rays 10 that emerges toward the sides of the lamp 1, as shown with solid lines in FIG. 3, is reflected by the reflecting surface 3a of the reflecting mirror 3. At this time, the emission section 1a of the lamp 1 is positioned at the focus 5a of the ellipse forming the reflecting surface 3a. Hence, each bundle of rays 10 that is reflected by the reflecting surface 3a proceeds toward the other focus 5b owing to a characteristic of the ellipse.

This reflected bundle of rays 10 passes through concave lens 4 on the way to the focus 5a, and is refracted by the negative refracting power of this concave lens 4.

In this manner, the bundles of rays 10 reflected by the reflecting mirror 3 in the directions where rays are condensed toward focus 5b are refracted in negative directions by the concave lens 4, and are cast at a necessary angle of luminous intensity distribution as the light for range finding owing to a combination of this reflection and refraction.

In addition, since FIG. 3 is a cross-sectional view, a bundle of rays only in a certain direction is shown. The reflecting mirror 3, however, has a shape resulting from rotating the ellipse about the long axis (optical axis O), and hence bundles of rays 10 emitted from the lamp 1 to the reflecting mirror 3 are reflected by the entire reflecting surface 3a.

The bundle of rays 11 are emitted from the front of the lamp 1 move directly to the concave lens 4 without being reflected by the reflecting mirror 3, as shown with alternate long and short dash lines in FIG. 3, and emerge in directions where rays diffuse against the optical axis O. The bundle of rays 11 provide the necessary angle of luminous intensity distribution as the light for range finding, and this covers insufficiency of the bundle of rays 10. In addition, the outer bundle of rays in the bundle of rays 11 proceeds out of the angle of luminous intensity distribution.

In this manner, since the light for range finding that emerges from the flood light of FIG. 1 is formed with bundles of rays 10 and bundles of rays 11 nearby the optical axis O, the light emerges totally in an approximately round shape of luminous intensity distribution.

Figure 4:
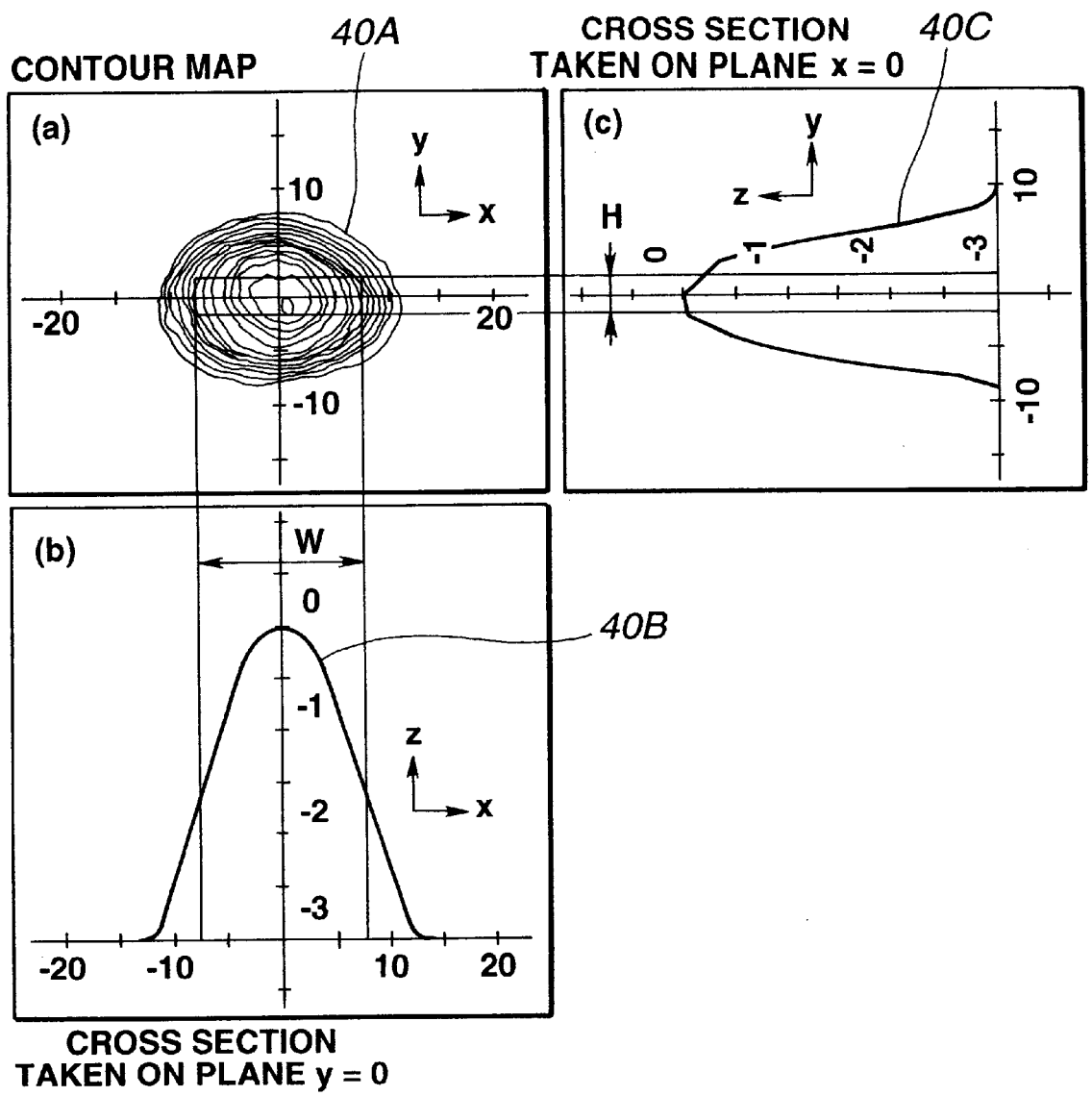
FIG. 4 is a characteristic chart of luminous intensity distribution showing the result of an experiment where rays that emerged from the flood light in FIG. 1 were measured.

Next, the characteristic of luminous intensity distribution of a bundle of rays generated by the flood light of this first embodiment is shown in FIG. 4. That is, FIG. 4 shows the result of an experiment wherein the characteristic of luminous intensity distribution of rays emerging from the flood light in FIG. 1 were measured. Contour lines 40A in FIG. 4 show the contour lines of luminous energy changes in the direction of the optical axis, and the characteristics 40B and 40C in FIG. 4 are characteristics in cross-sections taken on planes y=0 and x=0 respectively. In addition, it is assumed that, in FIG. 4, the optical axis O is the z-axis, the vertical direction orthogonal to the z-axis in FIG. 1 is the x-axis, and the direction orthogonal to the x-axis and z-axis is the y-axis.

In FIG. 4, ranges shown by W and H have sufficiently usable luminous energy as the light for range finding, and it is comprehensible that the characteristic of uniform luminous intensity distribution is obtained in this range. Here, the reason why the shape of the contour lines is wider in the X-direction than those in Y-direction is that the contour lines depend on the shape of the emission section (filament) 1a of the lamp 1, and this is made to coincide with the longitudinal direction of a range where the range finding device performs the range finding. Therefore, locating the flood light by using the shape of the emission section 1a of the lamp 1, it is possible to obtain the luminous intensity distribution of the flood light corresponding to a range finding range having a shape that is elongated lengthwise, without increasing components.

In this manner, according to the flood light of the first embodiment, it is possible to effectively use bundles of rays emitted from the light source lamp 1, and to cast the bundles of rays with the characteristic of uniform luminous intensity distribution. Hence, it is possible to construct a small flood light having a desirable characteristic of luminous intensity distribution as the light for range finding.

By the way, in the flood light, it is necessary to place the emission section 1a of the light source lamp 1 at the ellipse focus 5a of the reflecting mirror 3 in order to optimize the characteristic of luminous intensity distribution of bundles of rays that are cast. However, it is common to mass produce light source lamps 1 so that the central position of emission section 1a is dispersed. Therefore, in case the flood light uses a lamp wherein there is little degradation in the characteristic of luminous intensity distribution resulting from position dispersion of this emission section 1a, it is good for the flood light to have the construction shown in the first embodiment. As seen by comparing the maps of FIGS. 5 through 7, the characteristic of luminous intensity distribution depends greatly upon positioning of the emission section 1a.

Figure 5:
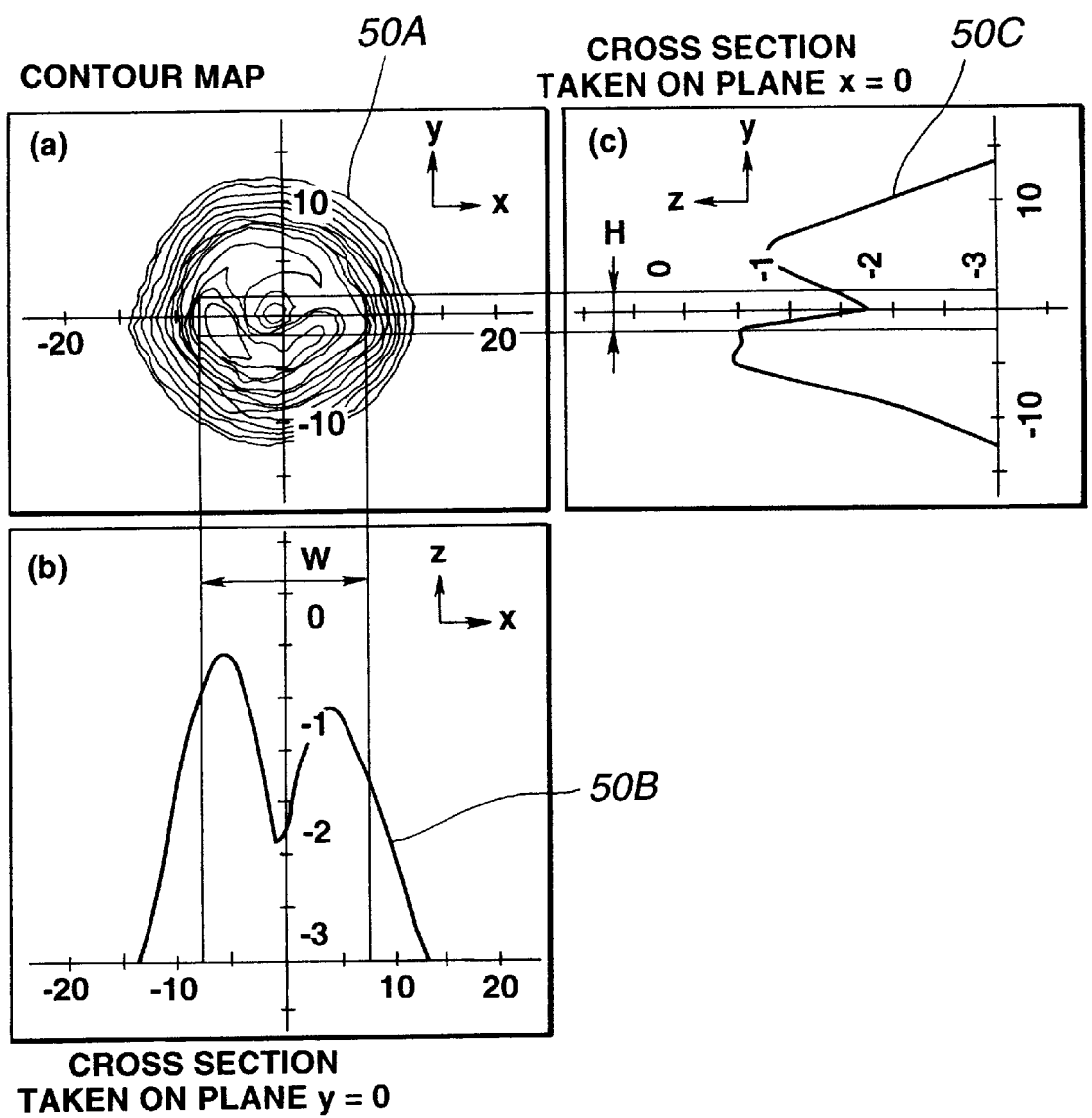
FIG. 5 is a characteristic chart of luminous intensity distribution for the flood light shown in FIG. 1 when the emission section of the flood light is out of a focus.
Figure 6:
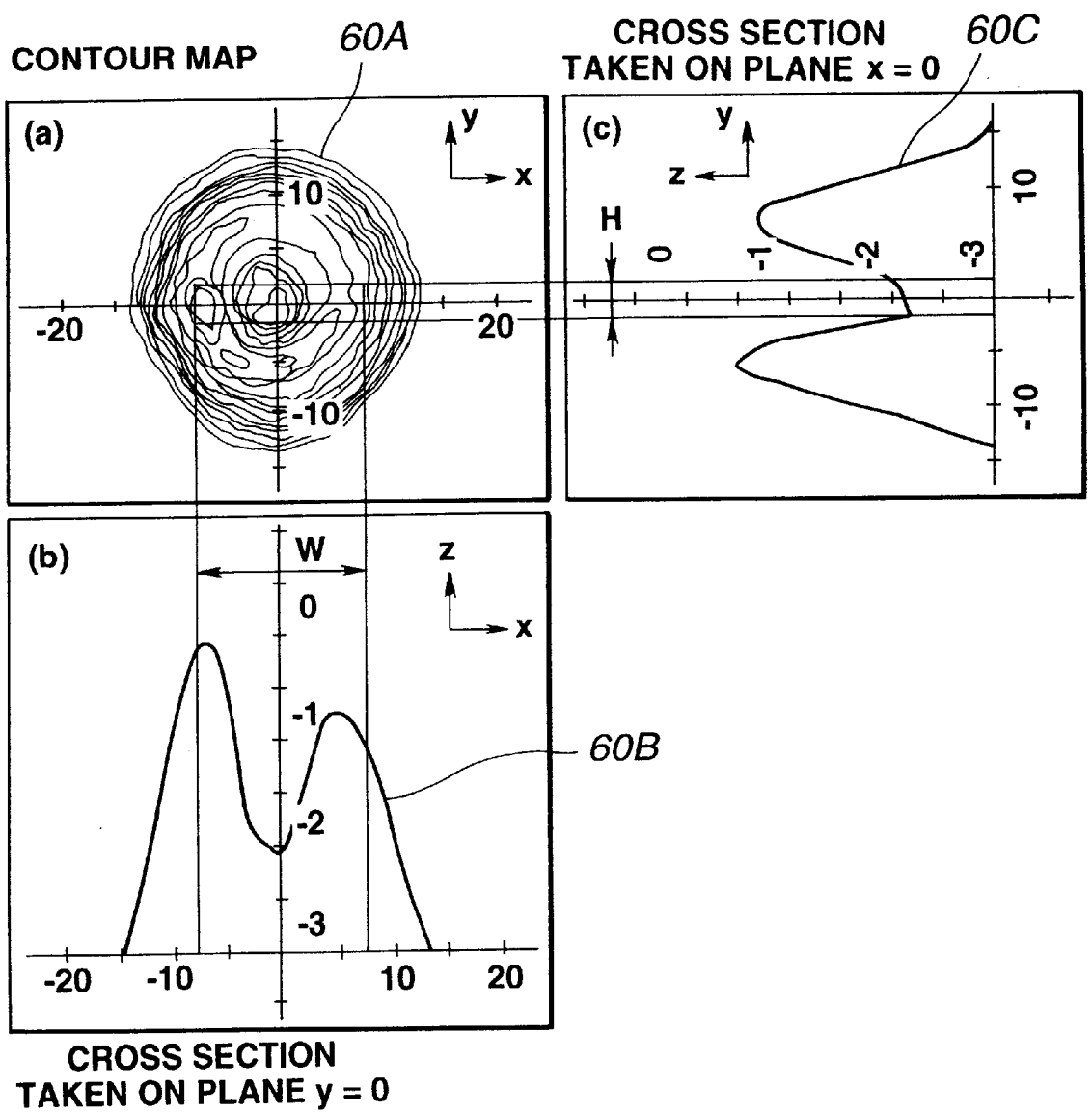
FIG. 6 is a characteristic chart of luminous intensity distribution in the flood light shown in FIG. 1 when the emission section is out of a focus.
Figure 7:
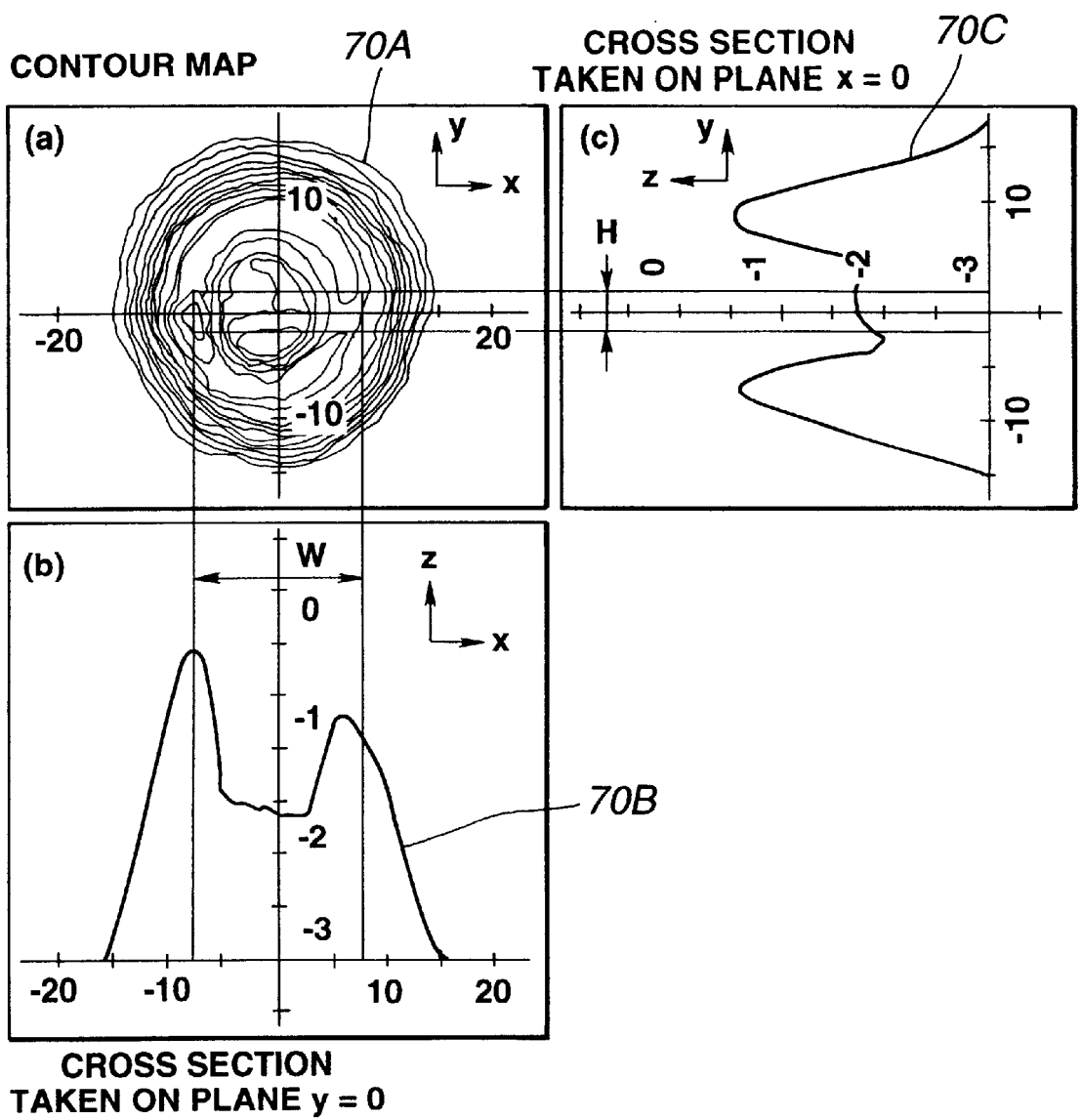
FIG. 7 is a characteristic chart of luminous intensity distribution in the flood light shown in FIG. 1 when the emission section is out of a focus.

That is, the characteristics of luminous intensity distribution of light cast from the flood light in case of the emission section 1a when the latter is displaced from focus 5a are shown in FIGS. 5 to 7. The characteristics are shown in FIG. 5 to FIG. 6, further to FIG. 7 in the increasing order of displacement of the emission section 1a's position from the focus 5a against the direction of the optical axis. In addition, in FIGS. 5 to 7, contour lines 50A, 60A, and 70A show the contour lines of luminous energy changes in the direction of the optical axis. In FIGS. 5 to 7, the characteristics 50B, 60B, and 70B are characteristics in cross-sections of the contour lines 50A, 60A, and 70A taken on plane y=0, and the characteristics 50C, 60C, and 70C are characteristics in cross-sections of the contour lines 50A, 60A, and 70A taken on plane x=0.

As is understood from these characteristic charts, the luminance nearby the center (around the optical axis O) is lowered as compared to the good characteristic of luminous intensity distribution shown in FIG. 4. In case of range finding with the light for range finding like this, a range where a range finding device performs the range finding is illuminated insufficiently, and hence the performance as the light for range finding is insufficient.

Then, there will be described with particular reference to FIG. 8, as a second embodiment of the present invention, a flood light which can correct a position of an emission section of a light source lamp mounted in the flood light.

In This embodiment, the same numerals are assigned to the parts that are the same as those in the flood light of the first embodiment, and descriptions of them are not repeated.

Figure 8:
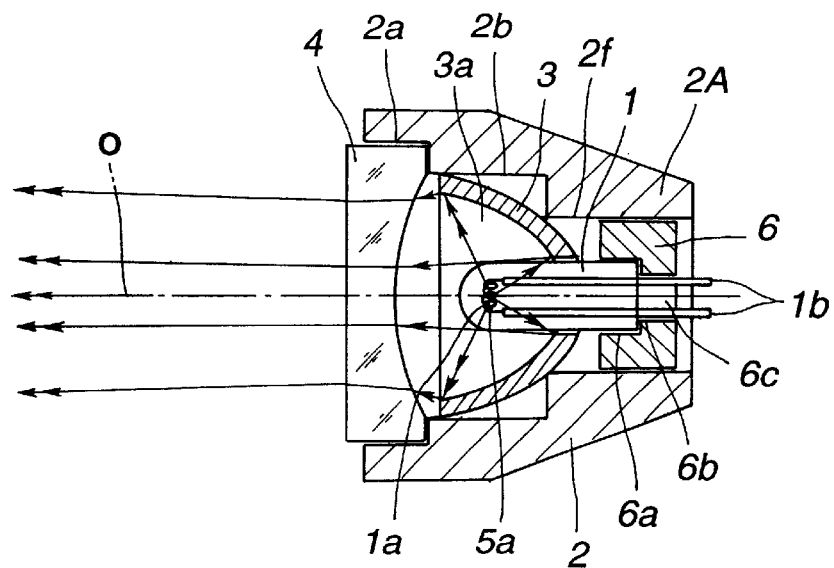
FIG. 8 is a central vertical cross-sectional view of a flood light constructed according to a second embodiment of the present invention.

As shown in FIG. 8, in the flood light of this embodiment, a through hole 2f whose diameter is the same as that of the holding hole 2c is formed in a fixing member 2A instead of the holding hole 2c as in the first embodiment. In this through hole 2f, a lamp holding member is fitted. Member 6 is a short cylindrical object whose diameter is nearly identical to that of the through hole 2f. In this lamp holding member 6, a lamp holding hole 6a is formed, the hole 6a which has a step 6b in its center in the direction of the optical axis and has an inner diameter that is nearly the same as the outer diameter of the lamp 1. In this lamp holding hole 6a, the light source lamp 1 is fitted with its base section being stopped by the step 6b. In addition, behind the lamp holding hole 6a, a through hole 6c is provided for passage of electrode terminals 1b.

In this embodiment, emission section 1a of the lamp 1 may be positioned correctly at the focus 5a by moving the lamp holding member 6 holding the lamp 1 toward the optical axis of the flood light. In this manner, the good characteristic of luminous intensity distribution as shown in FIG. 4 can be obtained by adjusting the position of the emission section 1a to the focal position 5a.

Owing to this, in addition to the effect obtained from the flood light of the first embodiment, it is possible to further obtain an effect of being able to provide a flood light suitable for mass-production because it is possible to easily position emission section 1a at the location of the focus 5a even if the position of the emission section 1a of the lamp 1 changes.

Next, a third embodiment of the present invention will be described with particular reference to FIG. 9.

In the flood light of this third embodiment, a reflecting mirror 14 is used, the mirror 14 having a reflecting surface 14a shaped as a paraboloid of revolution instead of the ellipsoidal reflecting mirror 3 in the first and second embodiments. Furthermore, a concave lens 15 having a refractive index different from that of the concave lens 4 is used instead of the concave lens 4 used in the first and second embodiments.

Figure 9:
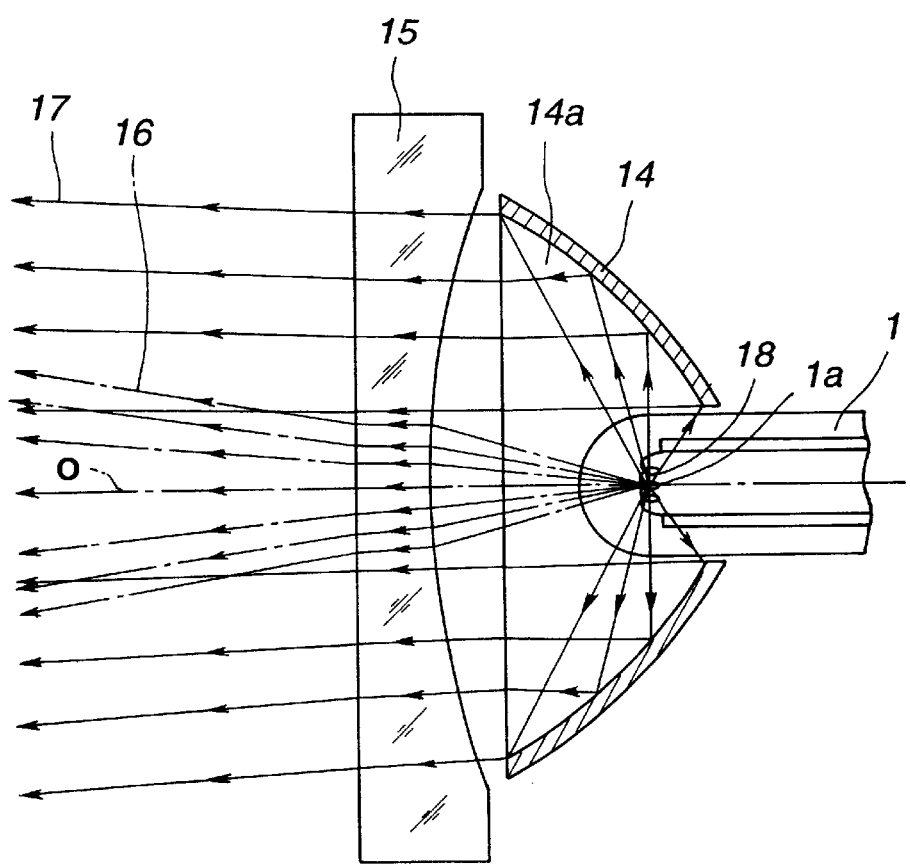
FIG. 9 is a central vertical cross-sectional view showing a major part of a flood light connected according to a third embodiment of the present invention.

As shown in FIG. 9, the light source lamp 1 is located so that its emission section 1a may be positioned at a focal position 18 of parabolic reflecting surface 14a of reflecting mirror 14. In addition, in front of the reflecting mirror 14, a concave lens 15 is provided, the lens 15 having a refractive index that is smaller than that of the concave lens 4 used in the first and second embodiments.

In the flood light having this construction, a bundle of rays 17 that is emitted from the lamp 1 and is reflected by the parabolic reflecting surface 14a pours into the concave lens 15 as a bundle of rays 17 that is in parallel to the optical axis O owing to a character of a parabola.

Here, the refracting power of the concave lens 15 is set so that the bundle of rays that emerges is at an angle of luminous intensity distribution necessary for range finding. Thus, it is necessary to make the characteristic of luminous intensity distribution of the bundle of reflected rays 17 (shown with solid lines), which emerges from the concave lens 15, nearly identical to that in the first embodiment. For this reason, as described above, the refracting index of the concave lens 15 is smaller than that of lens 4 because the angle of the bundle of rays that pours into the concave lens 15 is different.

On the other hand, a bundle of rays 16 (shown with alternate long and short dash lines) that is directly poured into the concave lens 15 emerges therefrom in the state of being diffused to the optical axis O by the concave lens 1S. In this time, diffusion of the bundle of rays 16 to the optical axis O is little because of the small refracting index of the concave lens 15. Therefore, plenty of the bundles of rays 16 can be used as the light for range finding.

In this manner, in the flood light of this embodiment, a bundle of rays pouring into the angle of luminous intensity distribution necessary as the light for range finding increases because of the small refracting index of the concave lens 15. Hence, it is possible to more effectively use the bundle of rays from the lamp 1. In addition, since it is good to use the concave lens 15 with a small refracting index, the degree of freedom of lens design increases in regard to material, thickness, and the like.

Next, a fourth embodiment of the present invention will be described with reference to FIG. 10. A flood light of this embodiment has a reflecting mirror 19 that is devised from the reflecting mirror 3 used in the first and second embodiments.

Figure 10:
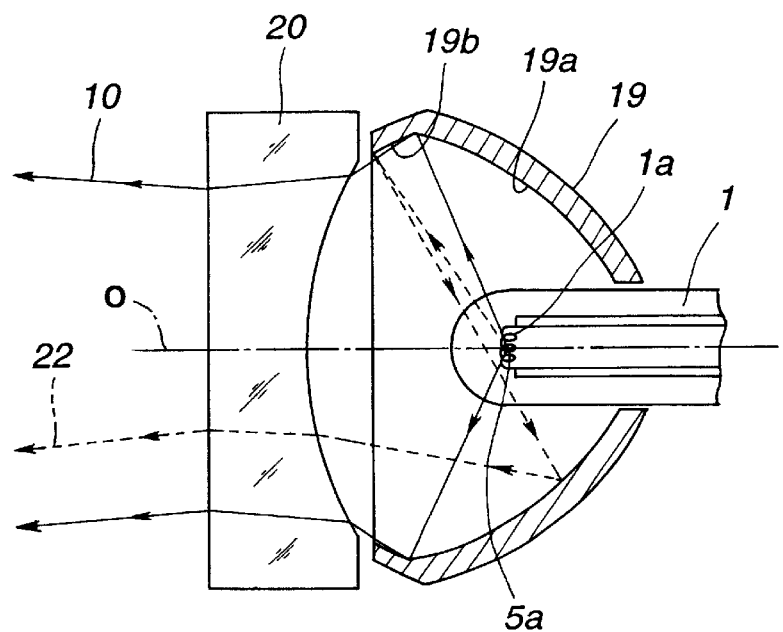
FIG. 10 is a central vertical cross-sectional view showing a major part of a flood light constructed according to a fourth embodiment of the present invention.

As shown in FIG. 10, reflecting mirror 19 used in this flood light has a reflecting surface 19a whose shape is nearly identical to that of the reflecting mirror 3 used in the first and second embodiments. Furthermore, at its larger opening the mirror 19 is formed with a reflecting surface 19b facing back toward the reflecting surface 19a. This reflecting surface 19b is formed in the shape of a ring inclining toward the inner front, and hence it reflects a bundle of rays rearward toward the reflecting surface 19a that it faces.

In addition, in front of the reflecting mirror 19, a concave lens 20 is provided, the lens 20 having a concave surface whose diameter is nearly identical to that of an opening provided at an end of the reflecting surface 19b of the reflecting mirror 19.

In the flood light constructed as in FIG. 10, a bundle of rays emitted from the light source lamp 1 emerges similarly to that in the first and second embodiments. At the same time, a bundle of rays leaking between the reflecting mirror 3 and concave lens 4 in the first and second embodiments is reflected by the reflecting surface 19b as shown with dotted lines shown with numeral 22 in FIG. 10. Furthermore, the bundle of rays is reflected by the reflecting surface 19a facing the reflecting surface 19b and passes through the concave lens 20. Therefore, by adding the reflecting surface 19b, it becomes possible to use plenty of bundles of rays as the light for range finding and to further improve the efficiency.

In addition, by making the diameter of a concave surface of the concave lens 20 nearly identical to the inner circumference of the end of the reflecting surface 19b, it becomes possible to make the outer diameter of the concave lens 20 small and to miniaturize the flood light.

By the way, if a reflecting mirror is formed with using progressive press working, which is wide-spread, in each of the above-mentioned embodiments, a joint of materials remains in the formed reflecting mirror. Usually, this joint is processed as little as possible, but it remains to a certain extent, and hence the efficiency becomes low.

Then, in the flood light of the present invention, a fifth embodiment will be described with reference to the exploded perspective of FIG. 11 as an embodiment that effectively uses the joint of the reflecting mirror 23 and facilitates assembly of mirror 23 with fixing member 24 in manufacturing of the flood light. Here, this embodiment is constructed by partially modifying the first embodiment. Therefore, the parts different from those in the first embodiment will be described.

Figure 11:
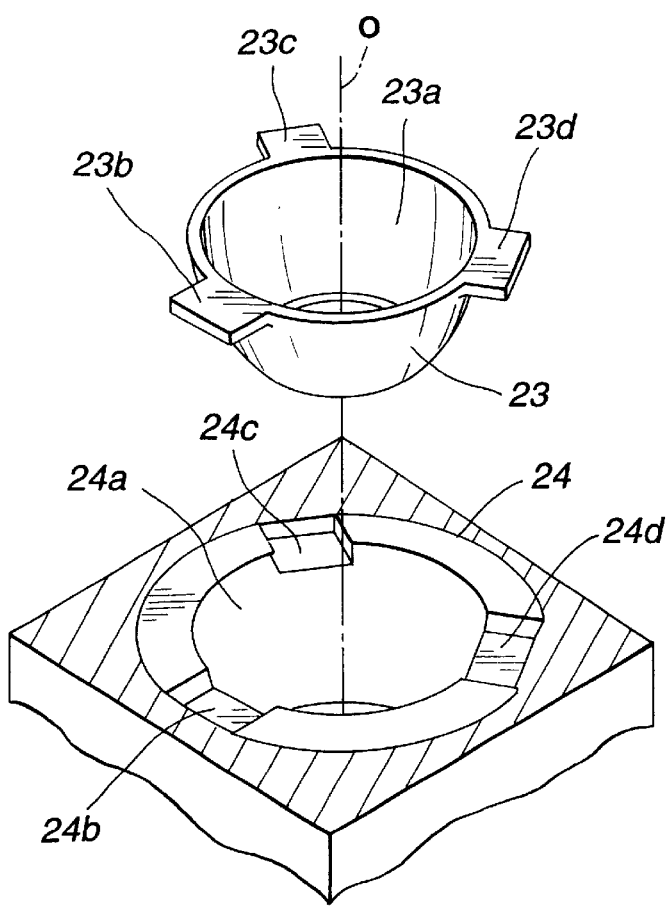
FIG. 11 is an exploded perspective view showing the major part of a flood light according to a fifth embodiment of the present invention.

In FIG. 11, a reflecting mirror 23, similarly to mirror 3 in the first embodiment, is formed with a bowl-like member having a reflecting surface 23a defined in an ellipsoidal body. At the outer periphery of an opening edge of this reflecting mirror 23, flange-like outward protrusions 23b, 23c, and 23d that are spaced at nearly equal intervals using the peripheral joint, are formed at the time of press working of the reflecting mirror 23. Furthermore, these protrusions extend in directions perpendicular to the long axis of the ellipse.

Moreover, notched or engaging concavities 24b, 24c, and 24d corresponding to the protrusions 23b, 23c, and 23d are formed in a holding concavity or hole 24a formed in a fixing member 24 holding the reflecting mirror 23. In addition, the holding hole 24a has a function equivalent to the holding hole 2b of the flood light of the first embodiment.

In the fifth embodiment constructed as described above, at the time of assembling of the flood light, the reflecting mirror 23 is fitted in the holding hole 24a with the protrusions 23b, 23c, and 23d being fitted in the notched concavities 24b, 24c, and 24d.

In this manner, using the joint occurring at the time of press working, the protrusions 23b, 23c, and 23d are formed, and it is possible to align the reflecting mirror 23 by fitting them in the notched concavities 24b, 24c, and 24d formed in the fixing member 24. Therefore, it is not necessary to remove the joint with additional working, and it is possible to effectively use the joint.

Moreover, in this embodiment, although three protrusions are provided for positioning stability, it is satisfactory to provide two protrusions from the joint at the time of press working, and it is possible to obtain a similar effect even if the number of the protrusions is not two or three.

Furthermore, by providing protrusions fitting in the notched concavities 24b, 24c, and 24d of the fixing member 24 for a concave lens (not shown), the reflecting mirror 23 is sandwiched with the fixing member 24 and the concave lens when the concave lens is fixed. Hence, it is possible to obtain another effect of being able to omit fixing work for the reflecting mirror 23.

Next, a sixth embodiment of the present invention will be described with particular reference to FIG. 12.

A flood light of this embodiment is constructed by revising the fixing member used in the first embodiment, and in particular, is intended to improve ease of assembling a reflecting mirror. Therefore, in this sixth embodiment the same numerals are assigned to the parts that are the same as those in the first embodiment, and descriptions of them is omitted except when there are differences.

In addition, a reflecting mirror used in this embodiment does not have a protrusion of a joint, and there is a mirror whose shape is nearly identical to that in the first embodiment. For example, it is possible to form the mirror by adopting a press working method called "pushback".

Figure 12:
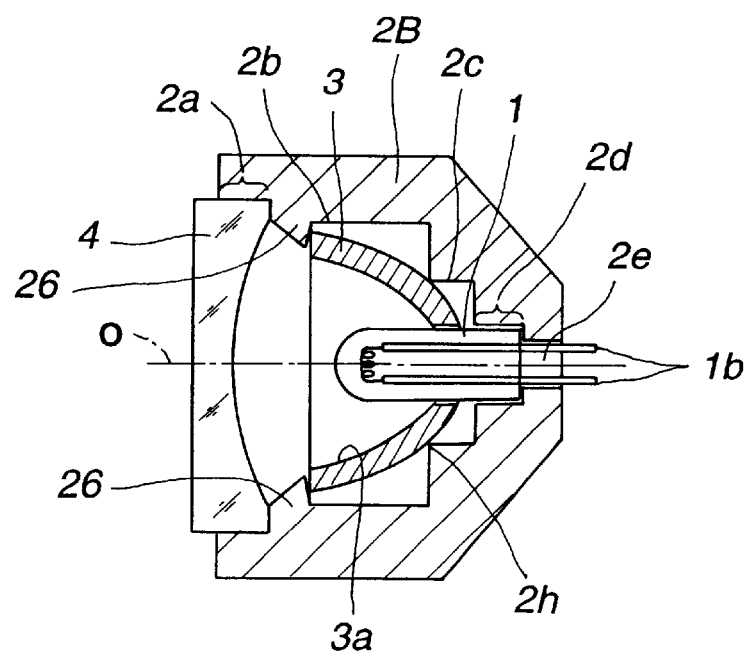
FIG. 12 is a central vertical cross-sectional view of a flood light constructed according to a sixth embodiment of the present invention.

As shown in FIG. 12, a fixing member 2B is nearly identical to that used in the first embodiment, but the following points are different. That is, in FIG. 12, a plurality of protrusions 26 for fixing the reflecting mirror 3 are formed at equal intervals in the inner circumference of an edge of the holding hole 2b provided in the fixing member 2B. In addition, in the drawing, only one pair of protrusions 26 and 26 that face each other are shown among the plurality of protrusions, and in the following description, the plurality of protrusions are called "protrusions 26".

These protrusions 26 are members that each have at its end a surface that is inclined to the outer front, have in the rear a surface that is nearly perpendicular to the optical axis O, and have a triangular cross-section. Furthermore, a gap between the protruded ends of the protrusions 26 that face each other is formed so that the gap may be smaller than the outer diameter of the end surface of the reflecting mirror 3 and larger than the inner diameter.

To assemble the flood light of this embodiment, first lamp 1 is assembled from left to right with respect to FIG. 12, and is fitted in the holding hole 2d.

After that, by filling adhesive in 2e where the electrodes 1b are inserted, the base section of the lamp 1 is fixed.

Subsequently, the reflecting mirror 3 is assembled from left to right with respect to FIG. 12. At this time, since the gap is smaller than the outer diameter of the end surface of the reflecting mirror 3, the reflecting mirror 3 enters with its outer diameter gradually flexing. Then, when the end of the reflecting mirror 3 passes through the ends of the protrusions 26, the flexed outer diameter of the reflecting mirror 3 recovers or snaps outward by means of its own elasticity. In this state, the reflecting mirror 3 is held in the fixing member 2B by the opening end surface of the mirror 3 contacting the rear surfaces of the protrusions 26 and by a section near to the rear of the outer circumferential surface of the reflecting mirror 3 contacting a step 2h formed by the holding holes 2b and 2c.

Finally, the concave lens 4 is assembled from left to right with respect to FIG. 12, and is fitted in the holding hole 2a of the fixing member 2B. In addition, the inner diameter of this holding hole 2a is slightly smaller than the outer diameter of the concave lens 4, and hence the concave lens 4 is press-fitted (in the state of a slight interference fit) and fixed.

In this manner, by forming the protrusions 26, 26 in the fixing member, it is possible to fix the reflecting mirror 3 without fixing means such as adhesive, and hence it is possible to shorten assembling time and to reduce cost. In addition, the reflecting mirror 3 is designed so that it may recover to its original shape after passing through the protrusions with being elastically transformed at the time of assembly. Furthermore, of course, it is good to make the protrusions have elasticity instead of making the reflecting mirror 3 have the elasticity.

Figure 13:
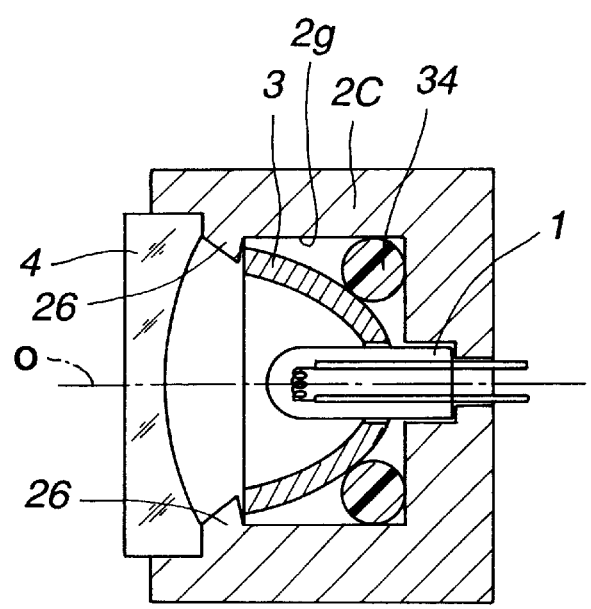
FIG. 13 is a central vertical cross-sectional view of a flood light constructed according to a seventh embodiment of the present invention.
Figure 14:
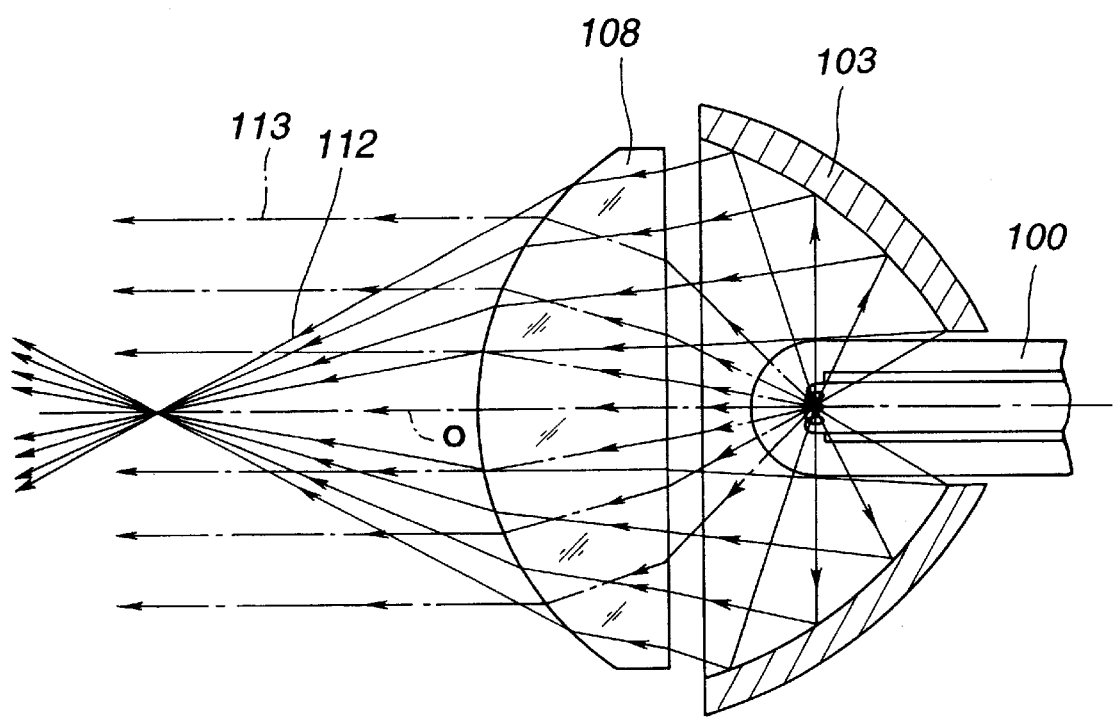
FIG. 14 is a central vertical cross-sectional view of a major part of a conventional flood light.
Figure 15:
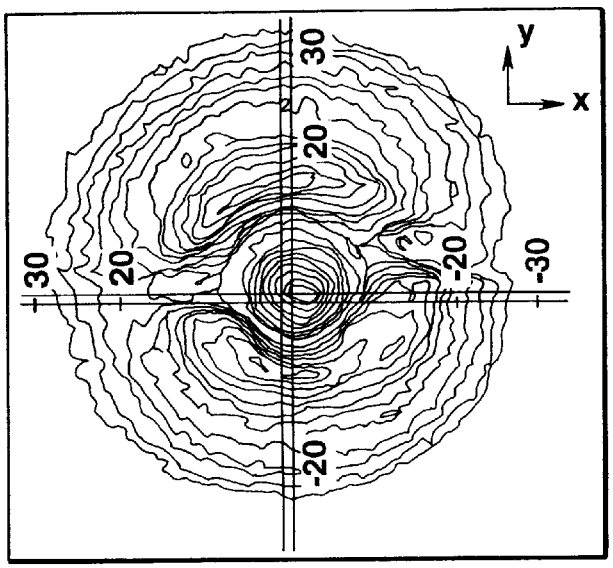
FIG. 15 is a characteristic chart of luminous intensity distribution showing the result of an experiment where rays emitted from the flood light in FIG. 14 were measured.
Figure 15:
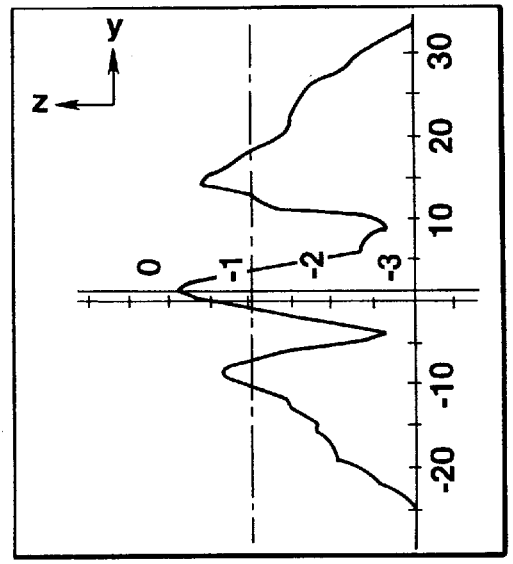
Figure 15:
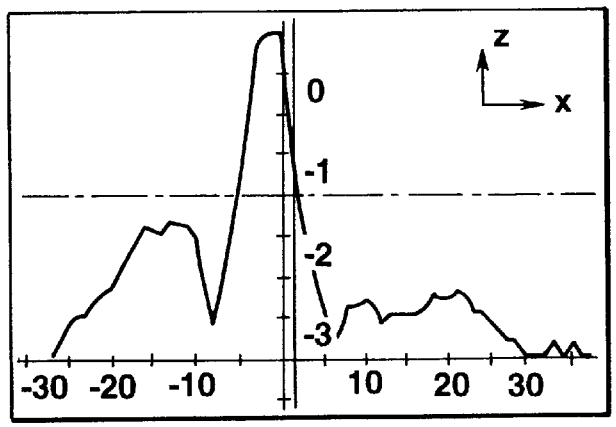

In a seventh embodiment of the present invention shown in FIG. 13, holding holes 2b and 2c (see FIG. 12) adopted in the sixth embodiment, are formed as a holding hole 2g having the same diameter as that of the holding hole 2b. Furthermore, inside this holding hole 2g, an elastic member 34 is provided, the member 34 being composed of an O-ring for holding the reflecting mirror 3. In addition, in this embodiment, together with the transformation of the holding hole to one of constant diameter throughout its length, the appearance of a fixing member 2C is also a little different from that of the fixing member 2B used in the sixth embodiment. Since other elements in FIG. 13 are constructed as in the sixth embodiment, the same numerals are assigned to the same members, and description of them is omitted.

Next, the assembly procedure of a flood light using the above-mentioned construction will be described. The assembly procedure of this flood light is nearly identical to that in the sixth embodiment, but the following points are different. Thus, before mounting the reflecting mirror 3 in the fixing member 2C, the elastic member 34 is mounted inside the holding hole 2g. Then, the reflecting mirror 3 that was flexed at the time of passing through the protrusions 26 recovers because of elasticity, to the original shape after passing through the protrusions 26. In that time, the reflecting mirror 3 is held in the fixing member 2C by the opening end surface of the reflecting mirror 3 contacting the rear surface of the protrusions 26 and by the section near to the rear of the outer circumference surface of the reflecting mirror 3 contacting the elastic member 34. Here, the elastic member 34 has such a size that the elastic member 34 can be assembled in elastic transformation in the space which is formed at the time of the reflecting mirror 3 being assembled in the fixing member 2C and is enclosed with the outer circumference of the reflecting mirror 3 and the inner surface of the holding hole 2g.

Thus, in this embodiment, even if there is dispersion for the shape of reflecting mirror the shape of fixing member 2C shape, and the like, this dispersion is absorbed with the elastic member 34 when assembled, and hence it is possible to decrease the dispersion of performance at the time of mass-production.

While the elastic member 34 is an O-ring in this embodiment, even if it is of a different cross-section suitable to the space or a different shape such as a ring-like coned disc spring, it is possible to obtain the same effect so long as it is an elastic member.

In addition, the concave lens used in each of the above-mentioned embodiments has a concave surface in one side, but, it is possible to obtain the same effect even if the concave lens has concave surfaces in both sides or it is a Fresnel type of concave lens. Furthermore, although it is possible to obtain a sufficient effect even if the concave section of the lens has only one curvature (spherical surface), the concave section may have an aspheric surface for improved efficiency. Moreover, is although an incandescent lamp is used in each of the above-mentioned embodiments as the emission means, the present invention is not limited to this, but it is possible to use various types of emission means such as a LED and a discharge tube.

In addition, the flood light of each embodiment can be applied to both types of range finding devices, that is, a passive type of device and an active type of device.

What is claimed is:

1. A flood light comprising:

a light source defining an optical axis;

a reflector disposed behind said light source having a reflecting surface formed of a concave surface which reflects rays of light produced by said light source toward a forward direction; and an optical element having a first optical surface and a second opposing surface, the first optical surface being smoothly arcuate and having a negative refracting power and being disposed forward of said light source, a first portion of said rays passing directly from said light source to said optical element and a second portion of said rays being reflected forward by said reflector toward said optical clement, said first optical surface facing said light source, said second, opposing surface being non-convex;

wherein a relative position of said light source is adjustable along said optical axis.

2. A flood light according to claim 1, further comprising:

a housing which holds said reflector; and a light source holding member which holds said light source and also adjusts said relative position along the optical axis with respect to said housing.

3. A flood light according to claim 2, wherein said light source includes a lamp having a filament and electrode terminals, said electrode terminals are passed through a through hole provided behind a lamp holding hole formed in said light source holding member.

4. A flood light according to claim 3, wherein said reflecting surface is substantially ellipsoidal in shape and said filament is located substantially at a focus of said reflecting surface.

5. A flood light according to claim 1, wherein said reflecting surface is substantially ellipsoidal in shape.

6. A flood light according to claim 5, wherein said light source is located substantially at a focus of said reflecting surface.

7. A flood light according to claim 5, wherein said optical element is located between first and second foci of said reflecting surface.

8. A flood light according to claim 7, wherein said light source is located substantially at a focus of said reflecting surface.

* * * * *